United States Patent
Nikander et al.

(10) Patent No.: US 8,837,729 B2
(45) Date of Patent: Sep. 16, 2014

(54) METHOD AND APPARATUS FOR ENSURING PRIVACY IN COMMUNICATIONS BETWEEN PARTIES

(75) Inventors: Pekka Nikander, Helsinki (FI); Jari Arrko, Kauniainen (FI); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1457 days.

(21) Appl. No.: 11/883,879

(22) PCT Filed: Feb. 10, 2006

(86) PCT No.: PCT/EP2006/050840
§ 371 (c)(1),
(2), (4) Date: Mar. 12, 2008

(87) PCT Pub. No.: WO2006/084895
PCT Pub. Date: Aug. 17, 2006

(65) Prior Publication Data
US 2008/0187137 A1    Aug. 7, 2008

(30) Foreign Application Priority Data
Feb. 11, 2005   (GB) .................................. 0502835.2

(51) Int. Cl.
*H04L 9/00* (2006.01)
*H04L 9/08* (2006.01)
*H04L 29/06* (2006.01)
*H04W 12/04* (2009.01)

(52) U.S. Cl.
CPC .......... *H04L 63/0414* (2013.01); *H04L 9/0844* (2013.01); *H04L 2209/80* (2013.01); *H04W 12/04* (2013.01); *H04L 2209/38* (2013.01); *H04L 63/164* (2013.01)
USPC ....................................................... 380/259

(58) Field of Classification Search
USPC .......... 379/201.11; 455/410, 411; 726/26, 30; 713/151, 160, 162, 168, 171; 380/268
See application file for complete search history.

(56) References Cited

U.S. PATENT DOCUMENTS 7,337,316 B1 *   2/2008  Evans et al. ................... 713/162
2002/0161884 A1 * 10/2002  Munger et al. ................ 709/224
(Continued)

FOREIGN PATENT DOCUMENTS

| EP | 0 234 100 A2 | 9/1987 |
| EP | 1 289 225 | 11/2003 |

(Continued)

OTHER PUBLICATIONS

International Search Report for PCT/EP2006/050840 mailed Aug. 25, 2006.

(Continued)

*Primary Examiner* — Brandon Hoffman
(74) *Attorney, Agent, or Firm* — Nixon & Vanderhye, P.C.

(57) ABSTRACT

A method of improving privacy by hiding, in an ordered sequence of messages M[x(1), D(1)], M[x(2), D(2)], etc, communicated between a first and at least one second party sharing a key k, metadata x(i) descriptive of message processing, wherein D(i) denotes payload data. The method comprises the first and the second party agreeing on a pseudo random mapping depending on a shared key k, $F_k$, mapping at least x(i) to y(i), and the first party modifying the messages by replacing x(i) by y(i) in each message M(x(i), D(i)). The first party then transmits the modified messages maintaining their original order, and on reception of a message M(y(m), D), the second party uses a mapping $G_k$ to retrieve position m of received value and the original value x(m).

31 Claims, 3 Drawing Sheets

(56) References Cited

U.S. PATENT DOCUMENTS

| | | | |
|---|---|---|---|
| 2003/0009666 A1* | 1/2003 | Jakobsson | 713/168 |
| 2004/0088544 A1* | 5/2004 | Tariq et al. | 713/162 |
| 2007/0116282 A1* | 5/2007 | Hawkes et al. | 380/239 |

FOREIGN PATENT DOCUMENTS

| | | |
|---|---|---|
| FR | 2 847 102 | 5/2004 |
| JP | 8-20846 | 3/1996 |
| WO | 2004/084050 A1 | 9/2004 |

OTHER PUBLICATIONS

UK Search Report for GB 0502835.2, date of search May 26, 2005.

Arkko et al., "Enhancing Privacy with Shared Pseudo Random Sequences," Ericsson Research, Feb. 17, 2005, pp. 1-11, XP002381142.

Golle et al., "Dining Cryptographers Revisited," LNCS No. 3027, Apr. 17, 2004, pp. 456-473, XP019005033.

Balfanz et al., "Secret Handshakes from Pairing-Based Key Agreements," Proceedings of the 2003 IEEE Symposium on Security and Privacy, May 11, 2003, pp. 180-196, XP010639721.

Arkko et al., "Extensible Authentication Protocol Method for 3$^{rd}$ Generation Authentication and Key Agreement (EAP-AKA) draft-arkko-pppext-eap-aka-15.txt," IETF Standard-Working-Draft, No. 15, Dec. 21, 2004, pp. 1-81, XP015010284.

T. Narten et al., IETF RFC 3041, "Privacy Extensions for Stateless Address Autoconfiguration in IPv6", The Internet Society, Jan. 2001, 17 pages total.

S. Kent et al., IPSEC IETF RFC 2401, "Security Architecture for the Internet Protocol", The Internet Society, Nov. 1998, 61 pages total.

B. Aboba et al., IETF RFC 2486, "The Network Access Identifier", The Internet Society, Jan. 1999, 8 pages total.

Chinese Office Action mailed Jan. 6, 2012 in Chinese application 200680011824.2.

* cited by examiner

METHOD AND APPARATUS FOR ENSURING PRIVACY IN COMMUNICATIONS BETWEEN PARTIES

This application is the U.S. national phase of international application PCT/EP2006/050840 filed 10 Feb. 2006, which designated the U.S. and claims priority to GB 0502835.2 filed 11 Feb. 2005, the entire content of each of which is hereby incorporated by reference.

FIELD OF THE INVENTION

The present invention, in one or more aspects, relates to a method and apparatus for ensuring privacy in communications between parties, and in particular, though not necessarily, to a method and apparatus for preventing the tracking of party movement.

BACKGROUND OF THE INVENTION

In communication systems where the user terminals and/or users are mobile, preventing the unauthorised tracking of users and equipment is important for privacy and possibly legal reasons. The main challenge in preventing tracking is to avoid the use of long-term or easy-to-correlate information (such as identifiers, data or other values) that constitutes explicit "identifiers" or otherwise allows users to be identified, and that make it possible to follow the same entity as it moves from one place to another (where the "place" may be geographical, i.e. physical, or logical, e.g. a network address). The term "identifier" as used below encompasses all possibilities. Here "place" can be both physical (geographical) or logical (e.g. network address). Some telecommunications mechanisms take this into account, and can use frequently and/or randomly changing identifiers. In GSM, the so-called TIMSI, Temporary IMSI (International Mobile Subscriber Identifier), is used to hide the true IMSI. However, in general such techniques are not useful unless they are enforced throughout the protocol stack. For instance, while wireless LAN authentication mechanisms can employ 'pseudonyms' [EAP-SIM, IETF draft-haverinen-pppext-eap-sim-14.txt; and EAP-AKA, IETF draft-arkko-pppext-eap-aka-14.txt] or even completely hide the authentication exchange from others [PEAP, IETF draft-josefsson-pppext-eap-tis-eap-10.txt], this is of little value as long as fixed link layer identifiers (e.g. MAC addresses) are used at a lower layer.

The problem exists in many forms. A particularly visible example is the transmission of cleartext, human-readable user identities such as NAIs [IETF RFC 2486]. Similar problems appear for the transmission of stable but "meaningless" identifiers such as IP addresses [PRIVACYADDR; IETF RFC 3041]. A less known problem is that even data that is completely independent of any real "identifier" can be used to track users. For instance, an IPSec SPI [IPSEC, IETF RFC 2401] can reveal that a node in one place is the same node as a node that appears later in another location, if the SPI value has not changed even though the IP addresses are no longer the same; e.g. with a 32-bit SPI, the chance is about 1 in 4 billion that it is not the same user if the SPI:s are the same. (IP addresses can change if NAT-T or MOBIKE are used.) This is particularly problematic for IKE SPIs, as there is no possibility for efficiently renegotiating IKE SPIs without revealing the previous SPIs in the process. For IPSec SPIs this is less of a problem, as the SPIs can be re-negotiated within the protection of the IKE SA, hence hiding the change from outsiders. Nonetheless, the problem remains that privacy enhancing measures can sometimes be defeated by unexpected factors.

The same problem arises in certain authentication mechanisms. For authentication purposes, two popular techniques are the use of public key cryptography and so-called hash chains. The problem with public keys is that the key, even if not tied to an identity, leaves "traces" of the user, since anybody can verify authenticity using the public key. Similarly, a hash chain is easily linkable in the forward direction by applying the hash.

Even data that changes for every packet can be used to track users. For instance, TCP or IPSec sequence numbers may in some cases be sufficient for the identification of equipment even if no other stable identifiers are present. As long as the sequence number space is sufficiently large and nodes distributed along to a sufficient degree, a node that presents a sequence number N in one place and N+1 (or something close to it) in another place shortly thereafter is likely to be the same node.

Existing techniques to deal with these problems include:

Hiding identifiers and other communications inside a protected tunnel or tunnels, such as TLS or IPSec. The drawback of this solution is that often other identifiers still remain visible outside the "tunnel".

Using "pseudonyms", as is done in GSM and some EAP methods. In this technique, an identifier is used for login to a service, and the service returns an encrypted token that the client can decrypt and use as the identifier for logging into the service the next time. A drawback of this scheme is that the new pseudonym has to be returned, which adds to the amount of signalling necessary. In any case, this solution may not be possible in all situations. For instance, the protection of sequence numbers in this manner would be possible in TCP as there are ACKs, but would be hard in IPSec because there may not be traffic in the return direction before a new packet needs to be sent. In any case, waiting for the new pseudonym before a second packet can be sent is inefficient.

Removing sequence numbers (and thereby linkability) may be considered where these are conventionally used. However, with present art this is not a universally viable option, as it creates a sender/receiver synchronisation problem, at least when used with unreliable data transport mechanisms such as IP.

For public keys and hash chains, an available method to improve privacy is to frequently generate new public keys/hash chains. However, this is computationally quite expensive.

To summarise the problem, metadata descriptive of the processing of data packets, e.g. security processing, may be used to attack privacy.

SUMMARY OF THE INVENTION

It is an object of the present invention to overcome or at least mitigate the above mentioned disadvantages. This and other objects are achieved by using values chosen from a pseudo-random sequence to represent values which, whilst not being user identifiers per se, are relatively long-lived in a communication or series of communications, or change in way which can be predicted by a third party.

According to a first aspect of the present invention there is provided a method of improving privacy by hiding, in an ordered sequence of messages $M[x(1), D(1)], M[x(2), D(2)]$, etc, communicated between a first and at least one second party sharing a key k, metadata $x(i)$ descriptive of message processing, wherein $D(i)$ denotes payload data, the method comprising:

said first and said second party agreeing on a pseudo random mapping depending on a shared key k, $F_k$, mapping at least x(i) to y(i);

said first party modifying the messages by replacing x(i) by y(i) in each message M(x(i), D(i)), said first party transmitting the modified messages maintaining their original order, on reception of a message M(y(m), D), the second party using a mapping $G_k$ to retrieve position m of received value and the original value x(m).

In certain embodiments of the invention, the method comprises said second party utilizing a window $[N_f, N_{f+t}]$ of values that it accepts, the window size t being predefined, and wherein said mapping $G_k$ is computed by applying said mapping $F_k$ to at least one $N_m$-value in said window and comparing the result to said y(m).

Preferably, $G_k$ is the inverse of $F_k$ and the step of retrieving the original value x(i) is performed by computing $G_k(y(i))$.

There may be a known relation r between position i in sequence and original value x such that i->x(r(i)). In certain embodiments, r(i)=i.

Each party may use a counter or agreed arithmetic function r to generate input values for a function capable of generating said pseudo-random sequence of values, each counter value or function result r(i) producing a corresponding value in the pseudo-random sequence according to $F_k$: {r(i),x(i)}->y(i).

In certain embodiments of the invention, metadata x(i) is a monotonically increasing sequence.

In certain embodiment of the invention, metadata x(i) describes security processing of messages M(i).

According to a second aspect of the present invention there is provided a method of ensuring privacy in communications between a first party and one or more second parties over a communications network, the method comprising:

making the same pseudo-random sequence of values available to each of the first and second parties, and maintaining a mapping between the sequence or the values and a value which is used by a party receiving a message sent by the first party to handle the message or its contents;

in messages to be sent between said first party and a second party, using a value from said sequence in place of the value to which the sequence is mapped; and at the or each receiving party, identifying the replaced value on the basis of the substituted value, and handling the message accordingly, wherein the value used from said sequence is changed from message to message or periodically.

In certain aspects of the present invention, the value to which the sequence is mapped may be considered as "metadata", that is data identifying data. The value may be relatively long-lived, or may change in a manner that can be predicted by a third party. Embodiments of the present invention conceal the true value or values from third parties who may be "snooping" on messages sent between the parties.

The value to which the sequence is mapped may be a value that is dynamically allocated to a party or communication. The value may be allocated temporarily to a party or communication session.

The mapped value may change in a predictable way, i.e. in a way in which a third party may be able to associate different values to the same party.

The value to which the sequence is mapped may be one of:

IKE or IPSec SPI

MAC (Media Access Control) address

IP address

Interface identifier part of the IPv6 address

Port number

Cryptographic key (e.g. using the same key twice can in some cases create an exploitable linkage)

Hash chain (consecutive values in hash chains are strongly linkable, but using new_value=PRF(h(old_value|P)) will remove such links to outsiders. Another formula that achieves the same result in this case would be new_value=PRF(old_value|P).

Sequence numbers—here identifier $N_i$ would correspond to sequence number i; the window handling would be done in the same way that sequence numbers are currently handled.

Preferably, said step of making the same pseudo-random sequence of values available to each of the first and second parties comprises providing a shared secret to the parties as well as a function capable of generating a pseudo-random sequence of numbers. Each party generates the pseudo-random sequence by using the shared secret and a corresponding sequence of values (e.g. an arithmetic progression or the consecutive outputs of a known finite state machine, an LFSR, or similar) as inputs to the function. The values of the pseudo-random sequence may be generated one at a time, i.e. as and when required, or a set of values may be generated for future use.

In an alternative embodiment of the invention, a sequence of pseudo-random values may be generated by a third party, and provided by that third party to one or both/all of the first and second parties.

The values of the pseudo-random sequence are preferably used by the sending party in a predefined order, or are chosen from a limited range of sequence values. This range may shift after use of one or more values. The receiving party has a knowledge (e.g. by generation strategy previously agreed using out-of-band signalling) of the order in which the identifiers are to be used, and/or of the window from which an identifier is chosen.

Each party may use a counter or agreed arithmetic function to generate input values for a function capable of generating said pseudo-random sequence of values, each counter value or function result producing a corresponding value in the pseudo-random sequence. The counter value or result may be modified in a predictable manner, e.g. multiplied or divided, by the function, prior to generation of the pseudo-random output. A counter may count in any appropriate manner.

Preferably, said function is a pseudo-random function. However, other functions may be capable of generating a suitable pseudo-random sequence, including a block cipher function, and may be used instead.

The output of said function may be used directly as an identifier for the first party. Alternatively, the output may be further processed to generate the identifier.

The values of said sequence may be used in order by the first party to identify itself in successive communications with the second party. Alternatively, the values may be used out of order, e.g. but within some predefined range.

Preferably, the method comprises defining a window of acceptable first party values at the second party, this window corresponding to a range of counter values. The lower end of the window may be defined based upon already received values, such that the window moves to the next value in the sequence following receipt of all preceding values.

Values may be generated as and when required at the first and second parties, e.g. just prior to sending of a communication from the first to the second party, and following receipt of a communication at the second party. (There is no need for simultaneous incrementing of the counters at the two parties.) Alternatively, one or both of the parties may pre-generate a set of identifiers for future use.

In one embodiment of the invention, the method is used to generate cryptographically generated addresses (CGAs) according to IPv6. More particularly, the Interface Identifier part of a CGA address is generated by using the counter value as an input to the Interface Identifier generation procedure.

A single value in a sequence of values may be used a number of times instead of just once, with the next value being taken into use based on pre-defined factor, e.g. when the sending side moves to a new location or when it receives a packet that uses the next value from the receiver.

The values may be used to demultiplex the packets at the receiving end, e.g. to order the packets temporally and/or to route packets to the correct destination.

The invention may be employed to hide/replace SPI numbers and other identifiers in IPSec or IKE.

The invention may be employed in a network access mechanism such as WLAN, GSM, or an authentication method such as EAP.

In some implementations of the invention, a third party such as a NAT may be provided with the information required to generate the value sequence. The third party may share the sequence with parties other than the communicating nodes for lawful intercept or other purposes.

According to a third aspect of the present invention there is provided a method of operating a mobile terminal or network node, the method comprising:

making a pseudo-random sequence of values available to the terminal or node, and maintaining a mapping between the sequence or the values and a value which is used by a party receiving a message sent by the terminal or node to handle the message or its contents; and in each of an ordered sequence of messages to be sent between the terminal or node and a second party, using a corresponding value from said pseudo-random sequence in place of the value to which the sequence is mapped.

According to a fourth aspect of the present invention there is provided a method of operating a mobile terminal or network node, the method comprising:

making a pseudo-random sequence of values available to the terminal or node, and maintaining a mapping between the sequence or the values and a value which is used by a party receiving a message sent by the terminal or node to handle the message or its contents; and for each of an ordered sequence of messages received at the terminal or node from a second party, mapping a sequence value contained in the message to said mapped value and using the mapped value to handle the message or its contents.

According to a fifth aspect of the present invention there is provided a method of generating a sequence of public keys for use in securing communications between parties, the method comprising:

providing a first public key to first and second parties;

agreeing a shared secret between the first and second parties;

providing the first and second parties with means for generating a sequence of further public keys using said first public key and said shared secret, such that the values of said sequence are pseudo-random in nature; and using public keys of said sequence to secure communications between the parties.

As an example of such a sequence of public keys, consider the "base" key $y=g^x$ (in a discrete logarithm based scheme), where consecutive keys are obtained by raising y to powers obtained from the pseudo-random sequence.

DETAILED DESCRIPTION OF CERTAIN EMBODIMENTS

The invention, in one or more aspects, will now be illustrated by reference to a generic communication system in which two parties wish to communicate with one another over a communication network. The parties may be user terminals or network based devices, or a combination of both. The communication comprises a plurality of multiplexed communications or messages, each including "metadata" descriptive or indicative of the way in which the communication or the message should be processed. Such data may relate to security processing and can be used to derive temporal relationships between communications and/or spatial relationships between a communication and a physical or logical entity. An exemplary temporal relationship may be determined from a sequence number, whilst an exemplary spatial relationship may be determined from an identity identifying a user, a network entity having transmitted the communication, or a logical entity such as for example a port number.

The parties (or "peers") agree on a specific sequence of values that are to be used. The easiest way to do this is to agree on a common pseudo-random function that the peers will use to derive the next value. This requires no signalling on a per-packet basis. The peers use a window of values that they accept; this way the loss of a packet does not destroy synchronization.

Figure 1:
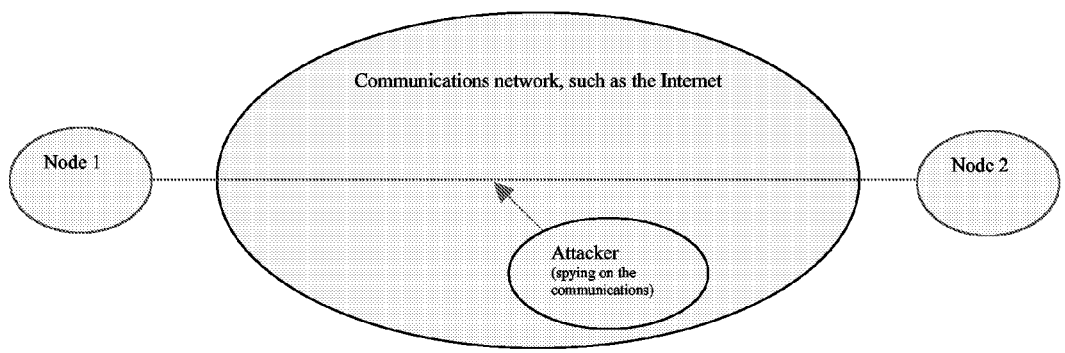
FIG. 1 illustrates schematically various parties involved in a secure communication procedure.
Figure 2:
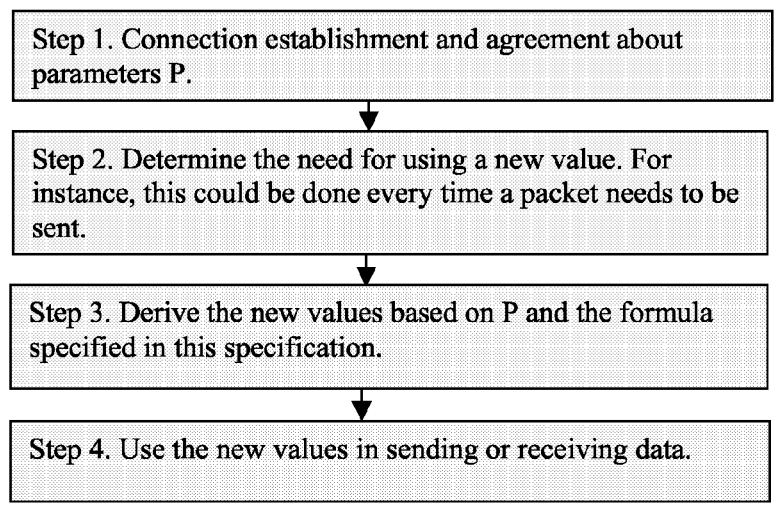
FIG. 2 is a flow diagram illustrating steps in a secure communication procedure.

More specifically, the peers agree on some secret parameters P as a part of their connection setup. For instance, in IKE, P could be derived based on the master key generated from establishing the IKE SA. This does not necessarily require any communication beyond existing protocols, as long as the peers know that both ends support this scheme. For instance, P could be set to h("privacy"|master-key). See FIGS. 1 and 2.

The next step is the use of a sequence-generating function, such as a pseudo-random function (PRF), to derive a number of random-like values. The input to this function is the secret parameter P. For instance, the first value could be PRF("1"|P), the second PRF("2"|P), and so on. Here "n" denotes a mapping of natural number n to a value "n"=r(n). If P is in itself a variable parameter, e.g. a sequence number, the added sequence numbers "1", "2", etc, may not be necessary. An alternative may be to use the function $$\text{value}\_j = F(P, \text{anchor\_ID}|"j"),$$

where F is an invertible one-to-one function (which a PRF usually isn't), e.g. a block cipher, and j is the sequence number. The anchor_ID could be a "real" identity, e.g. a real user name. The motivation behind this is that legitimate, trusted users (sharing P) will then get a simple and efficient way to go "backwards" and find the anchor_ID. In this embodiment, the receiver can efficiently reconstruct j from value_j, which means that the receiver can easily determine the received messages' original order (and other content). In case F is not one-to-one (as will probably be a more common case) the receiver can still (with high probability) efficiently reconstruct the original order as will be described next.

The sending peer uses each value in sequence. The receiving peer uses a window of values that it accepts, say, values $N_{i+1}, N_{i+2}, \ldots, N_{i+2}$ if all values up to $N_i$ have been seen so far. The values may be used out-of-order within the window, if the application in question allows or even requires this. For instance, in IPSec this would be needed. In other applications, lower layers (such as TCP) may already ensure that all values are used in sequence and that no values are skipped.

The window of accepted sequence values is used to determine the position in the sequence of a received value. A mapping function is then used to retrieve the original value that has been replaced. The mapping function is preferably chosen so that it is be one-to-one (and thus uniquely invertible) when there is a known relationship between the position within the window and the original value. The position need not directly determine the original value. However, once the position is determined a mapping "position" may be first applied prior to performing the inverse mapping. For instance, on reception of v (which is of form PRF(j|P)), the receiver does at first not know j. However, by evaluating PRF(Ni|P) for all Ni in the above mentioned window, the receiver will be very likely to find the correct j as the Ni which satisfies $$PRF(Ni|P)=v.$$

The only problem would be if there exists two distinct Ni, Nk in the window that maps to the same value. But assuming the PRF produces outputs of size t bits, and that the window has size w, the probability of such a collision is expected to be about $w2^{-t}$. For w=t=32, say, this probability is only about one in one billion. As a further example, suppose a data session runs at 50 packets per second. Such a data session could go on for about one month before we expect even a single collision error.

Note that this scheme can be used for any type of value or other metadata that might reveal information relating to the identity of the device or user. For instance:

MAC (Media Access Control) addresses
IP addresses
Interface identifier part of the IPv6 address
Port numbers
IKE or IPSec SPIs
Cryptographic keys (e.g. using the same key twice can in some cases create an exploitable linkage)
Hash chains (consecutive values in hash chains are strongly linkable, but using new_value= PRF(h(old_value)|P) will remove such links to outsiders. Another formula that achieves the same result in this case would be new_value=PRF(old_value|P).
Sequence numbers—here identifier $N_i$ would correspond to sequence number i; the window handling would be done in the same way that sequence numbers are currently handled.

In a preferred embodiment of this invention, the values/metadata are used to demultiplex the received packets at the receiving end. For example, IP addresses and TCP/UDP port numbers are used to demultiplex packets at the receiver, in order to pass them to the right receiving process. Similarly, IPSec SPIs are used to demultiplex the packets in order to direct them to the right Security Association for cryptographic processing. A suggested way of implementing this embodiment is to replace the variable holding the identifier with a short pre-computed list of generated values. When a hash table is used for demultiplexing, all the generated values are inserted into the hash table.

In another embodiment of this invention, the values have some cryptographic semantics. For example, in IPv6 the so-called Cryptographically Generated Addresses (CGAs) have an interface identifier part that has been generated as a hash of a public cryptographic key and some other parameters. The present invention can be applied to CGA by including a sequence counter to the other parameters, and using the generated sequence of interface identifiers instead of a single stable one.

Figure 3:
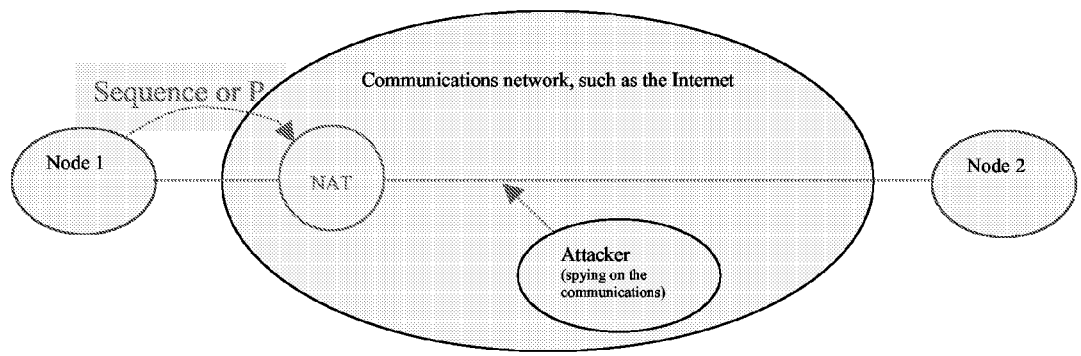
FIG. 3 illustrates schematically various parties involved in a secure communication procedure including a third party.

In another embodiment of this invention, the generated sequence is communicated to other communicating parties in addition to the original sender and final receiver. For instance, the sequence could be revealed to IP Network Address Translators (NATs) or other mediating devices, by securely transmitting the parameters needed to generate the sequence to the other communicating parties (see FIG. 3).

Figure 4:
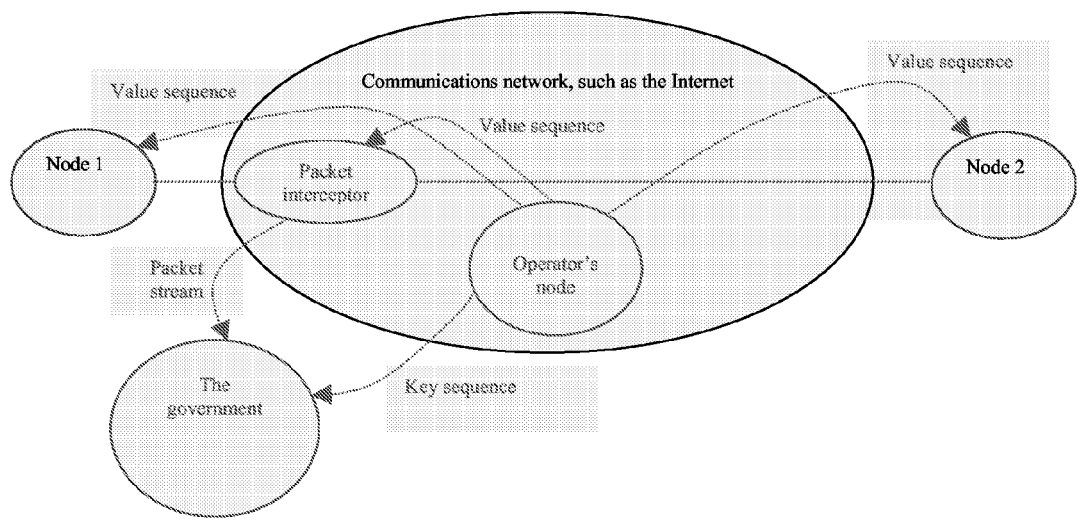
FIG. 4 illustrates schematically various parties involved in a secure communication procedure where lawful interception is required.

In another embodiment of this invention, the sequence is either generated by a third party or revealed to a third party such that this third party can later in turn reveal the sequence to others. This can be useful, for instance, for performing lawful interception. For instance, an operator-controlled node can generate a sequence of values and shared secrets for two communicating nodes and communicate these to the two nodes securely using the security association that was established when their subscriptions were established. If lawful intercept is then needed, the operator's node can reveal the sequence of values to a node that can capture packet streams, and reveal the sequence of shared secrets to the government agency wishing to perform the legal interception operation (see FIG. 4).

This invention could be used to provide ultra-private communications. A possible application is in the Host Identity Protocol (HIP), or for 4G link layer protocols and WLAN protocols.

As has been mentioned above, a specific application of the present invention is in IPSec which is intended to provide security to IP and upper-layer protocols (e.g. TCP or UDP). IPSec makes use of a Security Association (SA) database to associate keys and security services to traffic. An index called the Security Parameter Index (SPI) is included in IPSec protocol headers, and points to a particular SA in the SA database. An SPI will generally be allocated to a particular user or terminal for long term use. The SPI must be included in the IPSec header in clear text, and this therefore presents a weakness which can be exploited by malicious third parties to track user movements. By mapping the SPI to a sequence of pseudo-random values, and replacing the SPI in the IPSec headers with a changing sequence value, this weakness is removed.

Figure 5:
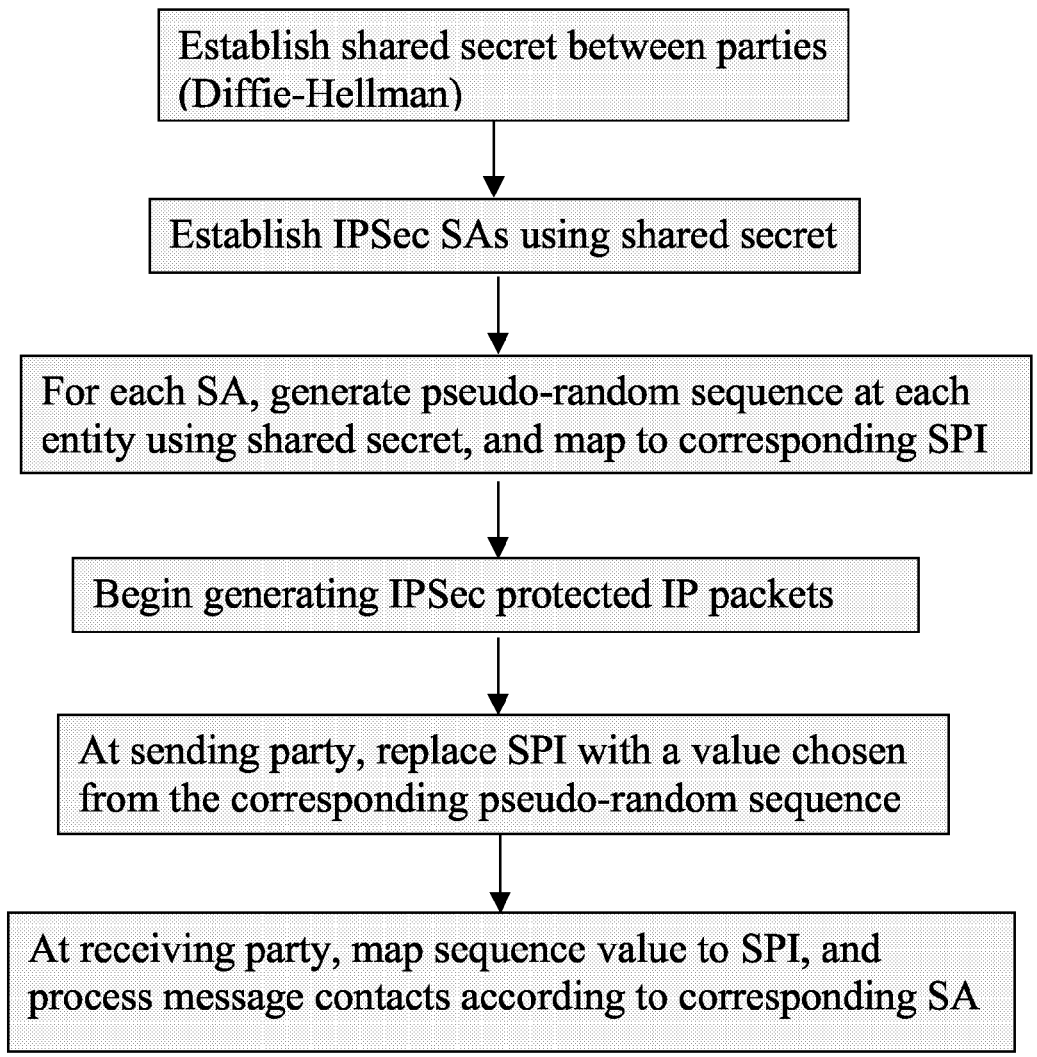
FIG. 5 is a flow diagram illustrating steps in a secure communication procedure using IPSec.

Typically, a new sequence value is chosen for each message. It will be appreciated that as an SA is established in each direction between the communicating parties, this mechanism will be applied separately for each SA. FIG. 5 is a flow diagram illustrating this process.

As IPSec headers also include sequence numbers that, again, may represent a weakness, the sequence numbers may also be mapped to a pseudo-random sequence.

It will be appreciated by the person of skill in the art that various modifications may be made to the above-described embodiments without departing from the scope of the present invention.

The invention claimed is:

1. A method of ensuring privacy in communications between a first party and one or more second parties over a communications network, the method comprising:
   making same pseudo-random sequence of values available to each of the first and second parties, and maintaining a mapping between the pseudo-random sequence of values and values which is used by a party receiving a message sent by the first party to handle the message or its contents;
   in messages to be sent between the first party and the second party, using a value from the pseudo-random sequence in place of the value to which the value from the pseudo-random sequence is mapped;
   at the receiving party, identifying the replaced value on the basis of the substituted value, and handling the message accordingly; and
   changing the value used from the pseudo-random sequence from message to message or periodically,
   wherein the first and second parties are end parties of the messages, and
   wherein the value is used as an identifier of the first party or is further processed to generate the identifier.

2. A method according to claim 1, wherein the second party authenticates the first party based on verifying that a sequence value contained in the communication is within a window of successive pseudo-random values.

3. A method according to claim 1, wherein the step of making the same pseudo-random sequence of values available to each of the first and second parties comprises, at each of the first and second parties, using a shared secret as an input to a function capable of generating the pseudo-random sequence of values.

4. A method according to claim 1, wherein the sequence of values is a sequence of consecutive values in a hash chain.

5. A method according to claim 1, wherein the replaced value is not a permanent identity of a party, but is dynamically and/or temporarily allocated to the party.

6. A method according to claim 1, wherein the replaced value is a value which changes between messages in a manner that can be predicted by third parties.

7. A method according to claim 1, wherein the replaced value is an IKE or IPSec Security Parameter Index.

8. A method according to claim 1, wherein the replaced value is one of:
   a MAC (Media Access Control) address,
   an IP address,
   an Interface identifier part of an IPv6 address,
   a Port number,
   a Cryptographic key,
   a Hash chain, and
   a Sequence number.

9. A method according to claim 1, further comprising generating the pseudo-random sequence of values at a third party, and providing the pseudo-random sequence to one or both of the first and second parties.

10. A method according to claim 1, wherein each party uses a counter or an agreed arithmetic function to generate input values for a function capable of generating the pseudo-random sequence of values, each counter value or function result producing a corresponding value in the pseudo-random sequence.

11. A method according to claim 1, further comprising defining a window of acceptable first party values at each second party, the window corresponding to a range of counter values.

12. A method according to claim 1, wherein the replaced value is a value used to demultiplex packets at a receiving end.

13. The method according to claim 1,
   wherein the messages are of a form $M[x(i), D(i)]$, i being an integer,
   wherein $x(i)$ denotes the value of the message and comprises metadata descriptive of message processing,
   wherein $D(i)$ denotes payload data of the message,
   wherein the step of making the same pseudo-random sequence of values available to the first and second parties comprises:
      the first and at least the second party agreeing on a pseudo random mapping depending on a shared key k, a function $F_k$, mapping each $x(i)$ to $y(i)$,
   wherein the step of changing the value from the pseudo-random sequence comprises:
      the first party modifying the messages by replacing $x(i)$ by $y(i)$ in each message $M(x(i), D(i))$, $y(i)$ being the value that maps to the value $x(i)$ in the pseudo-random sequence; and
      the first party transmitting the modified messages in sequence maintaining their original order, and
   wherein the step of identifying the replaced value comprises, on reception of a message $M(y(m), D(m))$, m indicating a position within the pseudo-random sequence, the second party using a mapping $G_k$ to retrieve the position m of the received value $y(m)$ and to retrieve the corresponding original value $x(m)$.

14. The method according to claim 13 comprising the second party utilizing a window $[N_l, N_{l+t}]$ of values that it accepts, the window size t being predefined, and wherein the mapping $G_k$ is computed by applying the mapping $F_k$ to at least one $N_m$-value in the window and comparing the result to the $y(m)$.

15. The method according to claim 13,
   wherein $F_k$ is one-to-one invertible and $G_k$ is an inverse of $F_k$, and
   wherein the step of retrieving the original value $x(i)$ is performed by computing $G_k(y(i))$.

16. The method according to claim 13, wherein there is a known relation r between position i of the value y in the pseudo-random sequence and the corresponding original value x such that i corresponds to $x(r(i))$.

17. The method according to claim 16, wherein $r(i)=i$.

18. The method according to claim 13, wherein each party uses a counter or agreed arithmetic function r to generate input values for a function capable of generating the pseudo-random sequence of values, each counter value or function result $r(i)$ producing a corresponding value in the pseudo-random sequence according to $F_k$: $\{r(i),x(i)\} \rightarrow y(i)$.

19. The method according to claim 18, wherein the $x(i)$ is constant throughout the sequence of messages.

20. The method according to claim 13, wherein the metadata $x(i)$ is a monotonically increasing sequence.

21. The method according to claim 13, wherein the metadata $x(i)$ describes security processing of messages $M(i)$.

22. A method of operating a mobile terminal or network node, the method comprising:
   making a pseudo-random sequence of values available to the mobile terminal or the network node, and maintaining a mapping between the pseudo-random sequence of values and values which is used by a party receiving a message sent by the mobile terminal or the network node to handle the message or its contents; and in each of an ordered sequence of messages to be sent between the mobile terminal or the network node and a second party, using a corresponding value from the pseudo-random sequence in place of the value to which the value from the pseudo-random sequence is mapped, wherein the mobile terminal or the network erode and the second party are end parties of the messages, wherein the corresponding value used from the pseudo-random sequence is changed from message to message or periodically, and wherein the corresponding value is used as an identifier of the mobile terminal or the network node or is further processed to generate the identifier.

23. A method of operating a mobile terminal or network node, the method comprising:

making a pseudo-random sequence of values available to the mobile terminal or the network node, and maintaining a mapping between the pseudo-random sequence of the values and a value which is used by the mobile terminal or the network node receiving a message sent by a first party to handle the message or its contents; and for each of an ordered sequence of messages received at the mobile terminal or the network node from the first party, mapping a sequence value contained in the message to said mapped value and using the mapped value to handle the message or its contents, wherein the mobile terminal or the network node and the first party are end parties of the messages, wherein the sequence value used from the pseudo-random sequence is changed from message to message or periodically, and wherein the sequence value is used as an identifier of the first party or is further processed to generate the identifier.

24. A transmit node, comprising:

a message modifier arranged to modify an original message to a modified message; and a message transmitter arranged to transmit the modified message to a receive node, wherein the original message comprises an original metadata and a payload data, the original metadata comprising an original value, wherein the modified message comprises a modified metadata and the payload data, the modified metadata comprising a modified value corresponding to the original value, wherein the message modifier is arranged to:
  select a replacement value from a sequence based on the original value in the original metadata; and
  replace the original value in the original metadata with the selected replacement value as the modified value of the modified metadata, wherein the sequence maps a plurality of original values to a plurality of replacement values, wherein the original value of the original metadata is one of the plurality of original values of the sequence and the modified value of the modified metadata is one of the plurality of replacement values of the sequence, wherein the sequence is also maintained in the receive node, wherein the transmit node and the receive node are end parties of the modified message, and wherein the modified metadata is used as an identifier of the transmit node or is further processed to generate the identifier.

25. The transmit node of claim 24, wherein the message modifier is arranged to select the replacement value from the sequence by generating the replacement value as an output of a mapping function F that takes as inputs a secret parameter P and the original value of the original metadata, and wherein the secret parameter P is shared by the receive node.

26. The transmit node of claim 25, wherein the function F is one-to-one invertible such that there is a mapping function G that is an inverse of F.

27. The transmit node of claim 24, wherein the sequence that maps the plurality of original values to the plurality of replacement values is received from a third party node.

28. A receive node, comprising:

a message receiver arranged to receive a modified message from a transmit node; and a message restorer arranged to restore an original message from the modified message, wherein the original message comprises an original metadata and a payload data, the original metadata comprising an original value, wherein the modified message comprises a modified metadata and the payload data, the modified metadata comprising a modified value corresponding to the original value, wherein the message restorer is arranged to:
  select the original value from a sequence based on the modified value of the modified metadata; and
  replace the modified value in the modified metadata with the selected original value as the original value of the original metadata, wherein the sequence maps a plurality of original values to a plurality of replacement values, wherein the original value of the original metadata is one of the plurality of original values of the sequence and the modified value of the modified metadata is one of the plurality of replacement values of the sequence, wherein the sequence is also maintained in the transmit node, wherein the transmit node and the receive node are end parties of the modified message, and wherein the modified metadata is used as an identifier of the transmit node or is further processed to generate the identifier.

29. The receive node of claim 28, wherein the message restorer is arranged to select the original value from the sequence by:

for a window of one or more original values $[N_l, N_r]$, generating corresponding output values by applying a mapping function F that takes as inputs a secret parameter P and the original value $N_i$, $i=1 \ldots t$;

comparing the modified value with the output values of the function F; and selecting as the original value of the original metadata the original value $N_i$ within the window whose corresponding output value of the mapping function F matches the modified value of the modified metadata, wherein the secret parameter P is shared by the transmit node.

30. The receive node of claim 28, wherein the function F is one-to-one invertible such that there is a mapping function G that is an inverse of F, and wherein the message restorer is arranged to select the original value from the sequence by selecting as the original value of the original metadata an output value of the function G whose input is the modified value of the modified metadata.

31. The receive node of claim 28, wherein the sequence that maps the plurality of original values to the plurality of replacement values is received from a third party node.

* * * * *